US012574135B2

(12) United States Patent
Liu

(10) Patent No.: US 12,574,135 B2
(45) Date of Patent: Mar. 10, 2026

(54) DATA TRANSMISSION METHOD AND APPARATUS, NETWORK DEVICE, AND STORAGE MEDIUM

(71) Applicant: ZTE Corporation, Shenzhen (CN)

(72) Inventor: Feng Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 316 days.

(21) Appl. No.: 18/578,860

(22) PCT Filed: Jul. 4, 2022

(86) PCT No.: PCT/CN2022/103679
§ 371 (c)(1),
(2) Date: Jan. 12, 2024

(87) PCT Pub. No.: WO2023/284578
PCT Pub. Date: Jan. 19, 2023

(65) Prior Publication Data
US 2024/0322929 A1 Sep. 26, 2024

(30) Foreign Application Priority Data
Jul. 12, 2021 (CN) .......................... 202110786820.8

(51) Int. Cl.
*H04J 3/16* (2006.01)
*H04L 45/74* (2022.01)
(52) U.S. Cl.
CPC ............ *H04J 3/1611* (2013.01); *H04L 45/74* (2013.01)

(58) Field of Classification Search
CPC .. H04J 3/1611; H04J 3/1617; H04J 2203/006; H04L 45/74; H04L 47/28;
(Continued)

(56) References Cited

U.S. PATENT DOCUMENTS

| | | |
|---|---|---|
| 12,047,300 B2 | 7/2024 | Chen et al. |
| 2020/0213022 A1 | 7/2020 | Götz et al. |

FOREIGN PATENT DOCUMENTS

| | | |
|---|---|---|
| CN | 112491493 A | 3/2021 |
| CN | 112583510 A | 3/2021 |

(Continued)

OTHER PUBLICATIONS

European Search Report for corresponding application EP22841216; Mail date Oct. 1, 2024.
(Continued)

*Primary Examiner* — Gary Mui
*Assistant Examiner* — Yewon Kim
(74) *Attorney, Agent, or Firm* — CANTOR COLBURN LLP

(57) ABSTRACT
A data transmission method and apparatus, a network device, and a storage medium are provided. In the method, a first network device determines whether there is a packet to be sent at a switching moment of a current time window; and the first network device sends a preset identification packet to a second network device in a case where there is no packet to be sent at the switching moment of the current time window, wherein the preset identification packet carries a window value of the current time window, and the window value is used for enabling the second network device to determine switching moments of different time windows of the first network device.

20 Claims, 7 Drawing Sheets

A first network device determines whether there is a packet to be sent at a switching moment of a current time window — S202

The first network device sends a preset identification packet to a second network device in a case where there is no packet to be sent at the switching moment of the current time window, wherein the preset identification packet carries a window value of the current time window, and the window value is used for enabling the second network device to determine switching moments of different time windows of the first network device — S204

(58) Field of Classification Search
CPC . H04L 12/43; H04L 12/4641; H04L 41/0654;
H04L 43/08
See application file for complete search history.

(56) References Cited

FOREIGN PATENT DOCUMENTS

| | | | |
|----|----------------|----|--------|
| JP | 2006246264 | A  | 9/2006 |
| JP | 2021513780 | A  | 5/2021 |
| WO | 2021062426 | A2 | 4/2021 |
| WO | 2021063191 | A1 | 4/2021 |

OTHER PUBLICATIONS

International Search Report for corresponding application PCT/
CN2022/103679 filed Jul. 4, 2022; Mail date Sep. 8, 2022.
Written Opinion for corresponding application PCT/CN2022/
103679 filed Jul. 4, 2022; Mail date Sep. 8, 2022.
Japanese Office Action; Application No. 2024501871; date of
mailing: Jul. 10, 2025; 8 pages.

Fig. 1

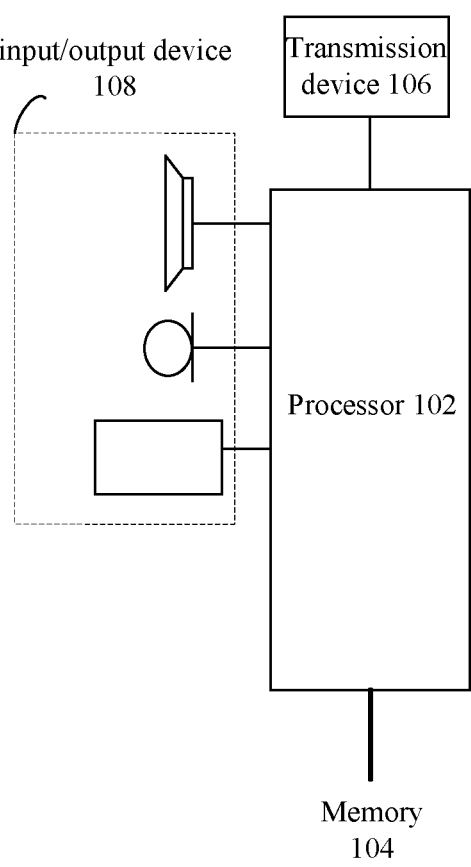

input/output device 108

Transmission device 106

Processor 102

Memory 104

Fig. 2

A first network device determines whether there is a packet to be sent at a switching moment of a current time window    S202

The first network device sends a preset identification packet to a second network device in a case where there is no packet to be sent at the switching moment of the current time window, wherein the preset identification packet carries a window value of the current time window, and the window value is used for enabling the second network device to determine switching moments of different time windows of the first network device    S204

Fig. 3

In a case where there is no packet to be sent at a switching moment of a current time window, a second network device receives a preset identification packet sent by a first network device, and determines the switching moment of the current time window of the first network device, wherein the preset identification packet comprises a window value of the current time window     ⟋S302

The second network device discards the preset identification packet after the second network device acquires the window value of the current time window     ⟋S304

Fig. 4

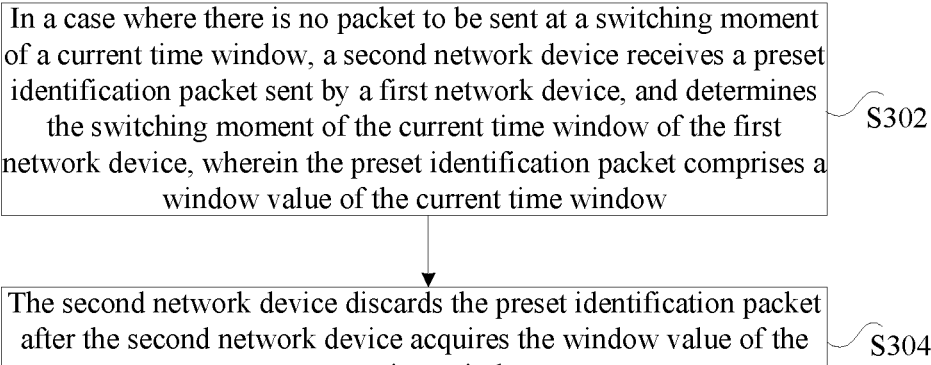

Fig. 5

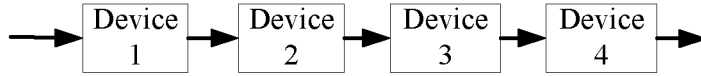

Fig. 12

| 6 bytes | 6 bytes | 2 bytes | 46-1500 bytes | 4 bytes |
|---|---|---|---|---|
| Destination address | Source address | TYPE | DATA | CRC |

|  |  |  | Window value |  |
|---|---|---|---|---|

Fig. 13

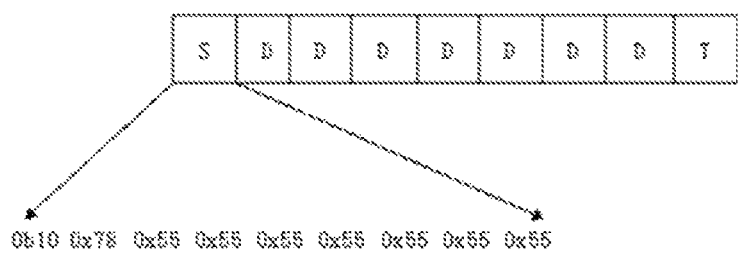

Fig. 14

|  | 6 bytes | 6 bytes | 2 bytes | 2 bytes | 2 bytes | 42 bytes | 4 bytes |
|---|---|---|---|---|---|---|---|
| pause frame | 0x01-80-C2-00-00-01 | xx-xx-xx-xx-xx-xx | 0x8808 | 0x0001 | yy-yy | reserved | CRC |
|  | Destination address | Source address | TYPE | Operat-ion code | Operation parameter | Reserved packet | Check part |
| Pause frame with time window | 0x01-80-C2-00-00-01 | xx-xx-xx-xx-xx-xx | 0x8808 | 0x0001 | 0x0000  n | Remaining reserved | CRC |

Window value

DATA TRANSMISSION METHOD AND APPARATUS, NETWORK DEVICE, AND STORAGE MEDIUM

CROSS-REFERENCE TO RELATED APPLICATION

The present disclosure is a National Stage Filing of the PCT International Application No. PCT/CN2022/103679 filed on Jul. 4, 2022, which is based on and claims priority to Chinese Patent Application No. CN202110786820.8 filed on Jul. 12, 2021 and entitled "Data Transmission Method and Apparatus, Network Device, and Storage Medium", the disclosure of which is incorporated herein by reference in its entirety.

TECHNICAL FIELD

The present disclosure relates to the field of communications technologies, and in particular, to a data transmission method and apparatus, a network device, and a storage medium.

BACKGROUND

With the flourishing development of Internet technologies, the content of information transmitted over a network has changed from a voice service to a data service, and the communication network has changed from a Synchronous Digital Hierarchy (SDH) network oriented for voice service to an Ethernet network oriented for data packets. In the related art, a Time-Sensitive Networking (TSN) technology is introduced into the network. A Cyclic Queuing and Forwarding (CQF) technology is applied in the TSN technology. According to the CQF technology, user packets are received in a time window, and all the received user packets are sent in a next time window.

After an asynchronous CQF technology is adopted, a downstream device acquires, by extracting a time window value carried in a packet, a time window at which the packet is sent at an upstream device, and learns about a switching moment of the time window of the upstream device according to the change of the time window values carried in the packets. However, when there are few packets or no packets sent by the upstream device, a downstream device cannot accurately determine the time window switching moment of the upstream device. In addition, when a fault exception occurs in the upstream device, there may be a sudden change of the time window in the upstream device, and the downstream device cannot detect the time window exception of the upstream device and still forward the packet according to a previous time window, so that the forwarding operation cannot meet a requirement of the new time window, a forwarding operation error occurs, and a user service is interrupted in a serious case.

For the technical problem that a downstream device cannot detect a time window exception of an upstream device when the upstream device is faulty, no effective solution has been proposed at present.

SUMMARY

Embodiments of the present disclosure provide a data transmission method and apparatus, a network device, and a storage medium, which may at least solve the problem that a downstream device cannot detect a time window exception of an upstream device.

According to an embodiment of the present disclosure, a data transmission method is provided, including: determining, by a first network device, whether there is a packet to be sent at a switching moment of a current time window; and sending, by the first network device, a preset identification packet to a second network device in a case where there is no packet to be sent at the switching moment of the current time window, wherein the preset identification packet carries a window value of the current time window, and the window value is used for enabling the second network device to determine switching moments of different time windows of the first network device.

According to another embodiment of the present disclosure, a data transmission method is provided, including: in a case where there is no packet to be sent at a switching moment of a current time window, receiving, by a second network device, a preset identification packet sent by a first network device, and determining, by the second network device, the switching moment of the current time window of the first network device, wherein the preset identification packet includes a window value of the current time window; and discarding the preset identification packet after the second network device acquires the window value of the current time window.

According to another embodiment of the present disclosure, a data transmission apparatus is provided, including: a determination unit, configured to determine whether there is a packet to be sent at a switching moment of a current time window; and a sending unit, configured to enable the first network device to send a preset identification packet to a second network device in a case where there is no packet to be sent at the switching moment of the current time window, wherein the preset identification packet carries a window value of the current time window, and the window value is used for enabling the second network device to determine switching moments of different time windows of the first network device.

According to another embodiment of the present disclosure, a data transmission apparatus is provided, including: a determination unit, configured to enable, in a case where there is no packet to be sent at a switching moment of a current time window, a second network device to receive a preset identification packet sent by a first network device, and determine the switching moment of the current time window of the first network device, wherein the preset identification packet includes a window value of the current time window; and a discarding unit, configured to discard the preset identification packet after the second network device acquires the window value of the current time window.

According to another embodiment of the present disclosure, a computer-readable storage medium is further provided. The computer-readable storage medium stores a computer program, wherein the computer program, when running on a processor, causes the processor to execute the operations in any one of the method embodiments.

According to another embodiment of the present disclosure, an electronic device is provided, including a memory and a processor, wherein the memory stores a computer program, and the processor is configured to run the computer program so as to execute the operations in any one of the method embodiments.

According to the embodiments of the present disclosure, it is determined whether there is a packet to be sent at a switching moment of a current time window; and the first network device sends a preset identification packet to a second network device in a case where there is no packet to be sent at the switching moment of the current time window, wherein the preset identification packet carries a window value of the current time window, and the window value is used for enabling the second network device to determine switching moments of different time windows of the first network device. By virtue of the solution, the downstream device is able to accurately know the switching position of the time window of the upstream device based on the sent supplementary packets specifically defined, so that the downstream device can quickly forward the user service according to the new time window after the sudden change, thereby shortening the fault recovery time, and improving the communication efficiency.

BRIEF DESCRIPTION OF THE DRAWINGS

FIG. 1 is a block diagram of the hardware structure of a mobile terminal for implementing a data transmission method according to an embodiment of the present disclosure;

FIG. 2 is a flowchart of a data transmission method according to an embodiment of the present disclosure;

FIG. 3 is a flowchart of another data transmission method according to an embodiment of the present disclosure;

FIG. 4 is a schematic diagram of a packet transmission process in an Ethernet network according to an embodiment of the present disclosure;

FIG. 5 is a schematic diagram of a working process of a CQF scheduling technology according to an embodiment of the present disclosure;

FIG. 12 is a schematic structural diagram of a format of an Ethernet packet according to an embodiment of the present disclosure;

FIG. 13 is a schematic diagram of a format of an Ethernet packet at an encoding layer according to an embodiment of the present disclosure;

FIG. 14 is a schematic structural diagram of a Pause frame carrying a time window value according to an embodiment of the present disclosure;

DETAILED DESCRIPTION

Figure 6:
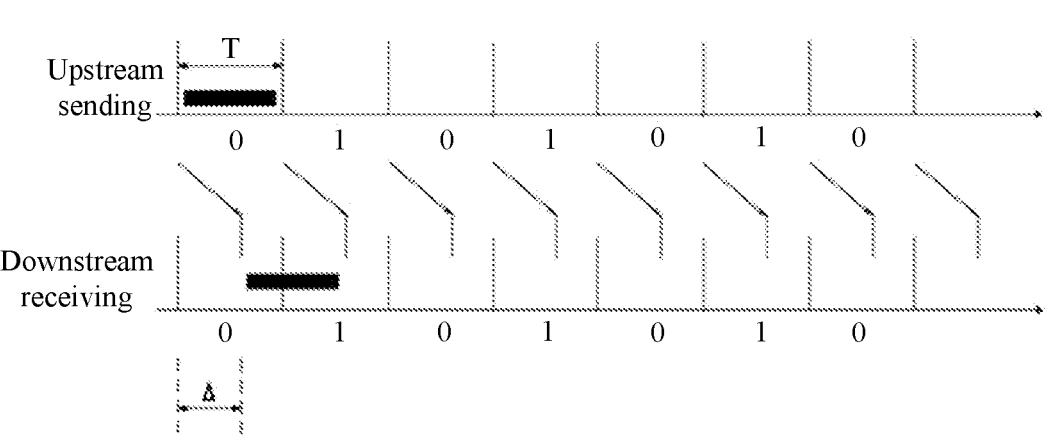
FIG. 6 is a schematic diagram illustrating the problem of packet delay caused by the fiber delay in the synchronous CQF technology according to an embodiment of the present disclosure.

The embodiments of the present disclosure will be described below in detail with reference to the accompanying drawings and in conjunction with embodiments.

It should be noted that, terms such as "first" and "second" in the description, claims, and accompanying drawings of the present disclosure are used to distinguish similar objects, but are not necessarily used to describe a specific sequence or order.

The method embodiments provided in the embodiments of the present disclosure may be implemented in a mobile terminal, a computer terminal, or a similar computing apparatus. Taking the running on a mobile terminal as an example, FIG. 1 is a block diagram of the hardware structure of a mobile terminal for implementing a data transmission method according to an embodiment of the present disclosure. As shown in FIG. 1, the mobile terminal may include one or more (only one is shown in FIG. 1) processors 102 (the one or more processors 102 may include, but are not limited to, a processing apparatus such as a microprocessor (e.g., Micro-Controller Unit (MCU)) or a programmable logic device (e.g., a Field Programmable Gate Array (FPGA)) and a memory 104 for storing data, wherein the mobile terminal may further include a transmission device 106 and an input/output device 108 for a communication function. A person having ordinary skill in the art may understand that the structure shown in FIG. 1 is merely exemplary, which does not limit the structure of the foregoing mobile terminal. For example, the mobile terminal may further include more or fewer components than shown in FIG. 1, or have a different configuration from that shown in FIG. 1.

The memory 104 may be configured to store a computer program, for example, a software program and a module of application software, such as a computer program corresponding to the data transmission method in the embodiments of the present disclosure. The processor 102 runs the computer program stored in the memory 104, so as to execute various function applications and data processing, that is, to implement the foregoing method. The memory 104 may include high-speed random access memory, and may also include non-volatile memory, such as one or more magnetic storage devices, flash memory, or other non-volatile solid-state memory. In some instances, the memory 104 may further include a memory remotely located with respect to the one or more processors 102, which may be connected to mobile terminals over a network. Examples of such network include, but are not limited to, the Internet, an intranet, a local area network, a mobile communication network, and combinations thereof.

The transmission device 106 is configured to receive or transmit data via a network. Specific examples of the described network may include a wireless network provided by a communication provider of the mobile terminal. In an example, the transmission device 106 may include a Network Interface Controller (NIC) that may be coupled to other network devices via a base station to communicate with the Internet. In an example, the transmission device 106 may be a Radio Frequency (RF) module for communicating wirelessly with the Internet.

FIG. 2 is a flowchart of a data transmission method according to an embodiment of the present disclosure. As shown in FIG. 2, the flow includes the following operations S202 and S204.

In operation S202, a first network device determines whether there is a packet to be sent at a switching moment of a current time window.

In operation S204, the first network device sends a preset identification packet to a second network device in a case where there is no packet to be sent at the switching moment of the current time window, wherein the preset identification packet carries a window value of the current time window, and the window value is used for enabling the second network device to determine switching moments of different time windows of the first network device.

In operation S202, during practical application, the first network device may include, but is not limited to, an upstream device in a network packet transmission process, and the second network device may include, but is not limited to, a downstream device in a network packet transmission process. The first network device may send a data packet to the second network device.

In operation S204, in practical application, time synchronization is not required between the upstream device and the downstream device, the switching moment of the time window of the upstream device may be different from the switching moment of the time window of the downstream device, only clock frequency synchronization between the upstream device and the downstream device is required, and time window switching speeds between the upstream device and the downstream device are the same. When sending a packet, the upstream device adds a sending time window value of the upstream device in the packet, and when receiving the packet, the downstream device may know in which time window the packet is sent in the upstream device by extracting the time window value carried in the packet. In a data packet transmission process, user packets are received in one time window, and then all the received user packets are sent out in the next time window. All the packets in one time window are received and sent in the same time window; and the packets in the same time window are always kept in the same time window when being transmitted on any node in a network.

By means of the present disclosure, it is determined whether there is a packet to be sent at a switching moment of a current time window; and the first network device sends a preset identification packet to a second network device in a case where there is no packet to be sent at the switching moment of the current time window, wherein the preset identification packet carries a window value of the current time window, and the window value is used for enabling the second network device to determine switching moments of different time windows of the first network device. By virtue of the solution, the downstream device is able to accurately know the switching position of the time window of the upstream device based on the additionally sent preset packets, so that the downstream device can quickly forward the user service according to the new time window after the sudden change, thereby shortening the fault recovery time, and improving the communication efficiency.

In an embodiment, the operation S202 that the first network device determines whether there is a packet to be sent at the switching moment of the current time window includes:

the first network device determines whether there is a packet to be sent in a time slice before the switching moment of the current time window; or the first network device determines whether there is a packet to be sent in a time slice after the switching moment of the current time window, wherein the time slice is used for indicating time required for sending an Ethernet packet.

In an embodiment, the operation that the first network device sends the preset identification packet to the second network device in the case where there is no packet to be sent at the switching moment of the current time window includes:

in a case where there is no packet to be sent in the time slice before the switching moment of the current time window, the first network device sends the preset identification packet to the second network device; or in a case where there is no packet to be sent in the time slice after the switching moment of the current time window, the first network device sends the preset identification packet to the second network device.

In an embodiment, the preset identification packet includes a type label field, and the operation that the first network device sends the preset identification packet to the second network device in the case where there is no packet to be sent at the switching moment of the current time window includes:

the first network device sends the preset identification packet to the second network device in the case where there is no packet to be sent at the switching moment of the current time window, so that the second network device determines a type of the preset identification packet according to the type label field, extracts the window value of the current time window, and discards the preset identification packet.

In an embodiment, the data transmission method may further include: in a case where there are multiple types of time windows at a transmitting port of the packet to be sent, and there is no packet to be sent at the switching moment of each type of time window, the first network device sends the preset identification packet including a type label to the second network device, so that the second network device determines switching moments of the multiple types of time windows according to the type label, wherein the type label is used for indicating different window types.

In an embodiment, the preset identification packet includes at least one of a pause packet for controlling data traffic, a Virtual Local Area Network (VLAN) label packet, a packet including a destination address and a source address of the packet, and a code block flow sequence.

FIG. 3 is a flowchart of another data transmission method according to an embodiment of the present disclosure. As shown in FIG. 3, the method includes the following operations S302 and S304.

In operation S302, in a case where there is no packet to be sent at a switching moment of a current time window, a second network device receives a preset identification packet sent by a first network device, and the second network device determines the switching moment of the current time window of the first network device, wherein the preset identification packet includes a window value of the current time window.

In operation S304, the preset identification packet is discarded after the second network device acquires the window value of the current time window.

In an embodiment, the operation S302 that in the case where there is no packet to be sent at the switching moment of the current time window, the second network device receives the preset identification packet sent by the first network device includes:

in a case where there is no packet to be sent in a time slice before the switching moment of the current time window, the second network device receives the preset identification packet sent by the first network device; or in a case where there is no packet to be sent in a time slice after the switching moment of the current time window, the second network device receives the preset identification packet sent by the first network device.

In an embodiment, the preset identification packet includes a type label field, and the operation that in the case where there is no packet to be sent at the switching moment of the current time window, the second network device receives the preset identification packet sent by the first network device includes:

in the case where there is no packet to be sent at the switching moment of the current time window, the second network device determines a type of the preset identification packet according to the type label field, and extracts the window value of the current time window and discards the preset identification packet.

In an embodiment, the described data transmission method may further include: in a case where there are multiple types of time windows at a transmitting port of the packet to be sent, and there is no packet to be sent at the switching moment of each type of time window, the second network device receives packets corresponding to the multiple types of time windows, wherein the packets corresponding to the multiple types of time windows include different type labels; and the second network device determines switching moments of the multiple types of time windows according to the type labels.

According to the embodiments of the present disclosure, in a case where there is no packet to be sent at a switching moment of a current time window, a second network device receives a preset identification packet sent by a first network device, and the second network device determines the switching moment of the current time window of the first network device, wherein the preset identification packet includes a window value of the current time window; and the preset identification packet is discarded after the second network device acquires the window value of the current time window. By virtue of the solution, the downstream device is able to accurately know the switching position of the time window of the upstream device based on the additionally sent preset packets, so that the downstream device can quickly forward the user service according to the new time window after the sudden change, thereby shortening the fault recovery time, and improving the communication efficiency.

With the flourishing development of Internet technologies, the content of information transmitted over a network has changed from a voice service to a data service, and the communication network has changed from a Synchronous Digital Hierarchy (SDH) network oriented for voice service to an Ethernet network oriented for data packets. The length of an ordinary Ethernet packet is not a fixed value (between 64 bytes and 9,600 bytes). During transmission, there may be packets with various lengths confounded in a packet flow. These packets influence each other during processing. The actual processing time when a user packet is processed inside a device is uncertain, which results in uncertain delay of packet processing. For example, when packets from a plurality of different ports converge to one egress port, it is possible that a long packet having a low priority blocks a short packet having a high priority. For example, when a long packet with a low priority is being output, a short packet with a high priority also needs to be output, in such a case, although the short packet has a high sending priority, the short packet with the high priority may not be sent until the sending of the long packet with the low priority is completed, this avoids packet interruption during sending of packets with low priorities. However, since the length of a packet with a low priority is uncertain, the waiting time of a packet with a high priority is uncertain, which means that the waiting delay of a packet with a high priority is uncertain, causing a large delay jitter. Since a packet with a low priority may be very long, correspondingly, a waiting time of a packet with a high priority is very long, compared with an actually required sending time of the short packet with the high priority (the sending time of the short packet is very short), the waiting time is far greater than the actual sending time, which means that the main reason for the high priority packet staying within the device is the waiting time caused by blocking, however, the actual processing time of the high priority packet is very short. When a packet is transmitted through a plurality of devices on a network, uncertain delay and jitter occur at each device, and the delay and jitter at the plurality of devices are accumulated, so that the total transmission delay and jitter of the packet will be very large, thereby affecting transmission quality of the packet.

At present, a Time-Sensitive Networking (TSN) technology is introduced into the network in order to address the above problem. A Cyclic Queuing and Forwarding (CQF) technology is applied in the TSN technology. According to the CQF technology, user packets are received in a time window, and all the received user packets are sent in a next time window. All packets within one time window are received and sent within the same time window, and the packets within the same time window are always maintained within the same time window when being transmitted on any node in the network. The total transmission time of the packet on the network is n*T, in which n is the number of network nodes that the packet passes during the entire transmission process, and T is the size of a time window. The packet may fluctuate within a time window, but does not exceed the time window, and a jitter value brought by the fluctuation of the packet is less than T, in this way, deterministic transmission of the packet on the network is achieved. The CQF technology requires time synchronization between an upstream device and a downstream device, and the upstream device and the downstream device switch between a sending time window and a receiving time window at the same time in the case of time synchronization, therefore, the technology is only suitable for a local area network in which the distance between the upstream device and the downstream device is very short, and the delay of an optical fiber between the devices can be ignored. In metropolitan area networks and wide area networks, the distance between devices is very large, and the transmission delay of a packet on an optical fiber is very long, that is, even though the upstream device and the downstream device switch between the sending time window and the receiving time window at the same time, when a packet sent by a transmitter of the upstream device is transmitted to the receiver of the downstream device through an optical fiber, the time when the packet actually reaches the receiving port of the downstream device has been delayed for a period of time, which may make the arrival time of the packet not match the switching moment of the time window of the receiver of the downstream device. In order to solve the problem caused by the optical fiber delay, an asynchronous CQF solution is proposed. By using the asynchronous CQF solution, time synchronization is not required between the upstream device and the downstream device, the switching moment of the time window of the upstream device may be different from the switching moment of the time window of the downstream device, only clock frequency synchronization and the same switching speed of the time windows is required between the upstream device and the downstream device. When sending a packet, the upstream device carries a sending time window value of the upstream device in the packet, and when receiving the packet, the downstream device may know the time window at which the packet is sent in the upstream device by extracting the time window value carried in the packet. The asynchronous CQF technology does not require time synchronization between the upstream device and the downstream device, and does not require time windows of the upstream device and the downstream device to be switched at the same time, thereby avoiding the influence of the optical fiber transmission time between the upstream device and the downstream device, and addressing the problem that the delay of an optical fiber cannot be ignored in a metropolitan area network and a wide area network.

After an asynchronous CQF technology is adopted, a downstream device acquires, by extracting a time window value carried in a packet, a time window at which the packet is sent at an upstream device, and learns about a switching moment of the time window of the upstream device according to the change of the time window values carried in the packets. However, when there are few packets or no packets sent by the upstream device, a downstream device cannot accurately determine the switching moment of the time window of the upstream device. In addition, when a fault exception occurs in the upstream device, there may be a sudden change of the time window in the upstream device, and the downstream device cannot detect the time window exception of the upstream device and still forward the packet according to a previous time window, so that the forwarding operation cannot meet a requirement of the new time window, a forwarding operation error occurs, and a user service is interrupted in a serious case.

In order to solve the above technical problem, based on the described embodiments, the data transmission method provided by the embodiments of the present disclosure may further include the following operations S1 to S3.

In operation S1, a transmitter of an upstream device determines whether there is a user packet to be sent at a switching moment of a time window.

In operation S2, in a case where there is no user packet to be sent at the switching moment of the current time window, a supplementary packet specially defined carrying a time window value is sent.

In operation S3, the receiver of the downstream device extracts the time window value carried in the packet, determines the switching moment of time window value of the upstream device, and uses the switching moment as reference information for subsequent decision and judgment.

In an embodiment, the operation S1 in the data transmission method further includes the following operations S11 to S14.

In operation S11, the transmitter of the upstream device determines whether there is a user packet to be sent at the switching moment of the time window. In some exemplary implementations, the following determining method may be adopted: it may be determined whether there is a user packet to be sent within a time slice before the switching moment of the time window, and whether there is a user packet to be sent within a time slice after the switching moment of the time window.

In operation S12, the size range of the time slice may be a minimum packet sending time defined by the Ethernet standard, or may be the actual packet sending time specially defined as required.

In operation S13, the time slice before the switching moment of the time window refers to a sending position capable of sending a supplementary packet before the switching moment of the time window.

In operation S14, the time slice after the switching moment of the time window refers to a sending position capable of sending a supplementary packet after the switching moment of the time window.

In an embodiment, the operation S2 of the data transmission method further includes the following operations S21 to S25.

In operation S21, the supplementary packet specially defined may be sent in one of several modes.

Mode 1: the two time slices before and after the switching moment are both checked;

Mode 2: only the time slice before the switching moment is checked;

Mode 3: only the time slice after the switching moment is checked.

In operation S22, in a mode in which both the time slices before and after the switching moment are checked, whether there is a user packet to be sent within the time slice before the switching moment of the time window and the time slice after the switching moment of the time window is checked, and when no user packet needs to be sent in any time slice, a supplementary packet specially defined is sent in the time slice.

In operation S23, in a mode in which only the time slice before the switching moment of the time window is checked, whether there is a user packet to be sent within the time slice before the switching moment of the time window is checked, and when no user packet needs to be sent in the time slice, a supplementary packet specially defined is sent in the time slice.

In operation S24, in a mode in which only the time slice after the switching moment of the time window is checked, whether there is a user packet to be sent within the time slice after the switching moment of the time window is checked, and when no user packet needs to be sent in the time slice, a supplementary packet specially defined is sent in the time slice.

In operation S25, the packet specially defined has specific flag information, which enables the downstream device to identify the packet specially defined and extract the time window value information carried in the packet specially defined.

In an embodiment, the operation S3 of the data transmission method further includes the following operations S31 to S35.

In operation S31, when receiving the user packet, the receiver of the downstream device extracts a time window value carried in the user packet; when receiving the packet specifically defined, the receiver of the downstream device extracts the time window value carried in the packet specifically defined and discards the packet specifically defined.

In operation S32, when a mode in which both the time slices before and after the switching moment are checked is adopted, in a case where the time window values extracted from two adjacent packets (including the user packet and the packet specially defined) are not the same, the boundary position of the two adjacent packets is the switching moment of the sending time window of the upstream device.

In operation S33, when the mode in which only the time slice before the switching moment of the time window is checked is checked, the end position of the packet specially defined is the switching moment of the sending time window of the upstream device, and the time window value carried in the packet specially defined is the sending time window value of the upstream device before the switching moment.

In operation S34, when the mode in which only the time slice after the switching moment of the time window is checked is adopted, the start position of the packet specially defined is the switching moment of the sending time window of the upstream device, and the time window value carried by the packet specially defined is the sending time window value of the upstream device after the switching moment.

In operation S35, the switching moment of the time window of the upstream device is obtained, and whether the switching moment of the time window of the upstream device is abnormal is determined according to whether the switching moment meets an expected situation.

Figure 7:
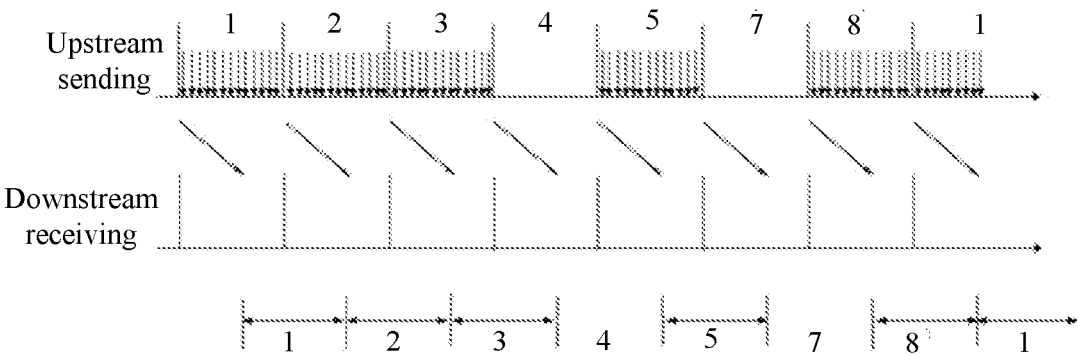
FIG. 7 is a schematic diagram of packet transmission in the synchronous CQF technology according to an embodiment of the present disclosure.
Figure 8:
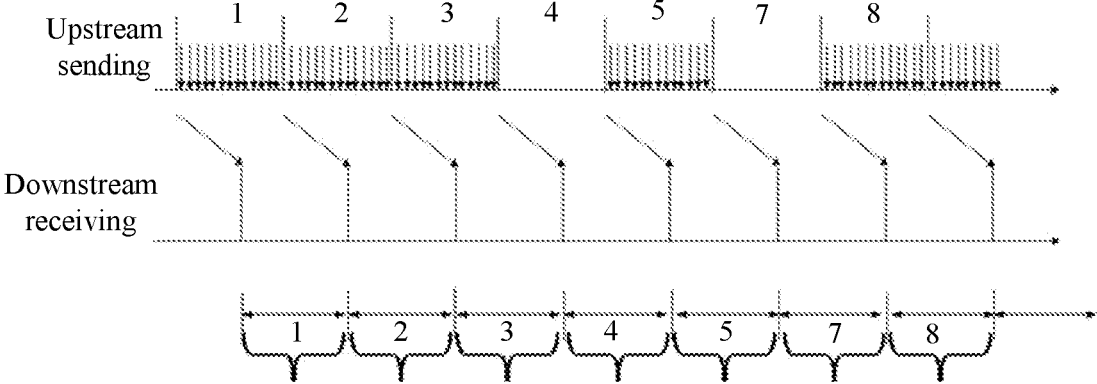
FIG. 8 is a schematic diagram of a working process of the asynchronous CQF technology according to an embodiment of the present disclosure.

Based on the described embodiments, in one or more embodiments, the described data transmission method may further include the following content. As shown in FIG. 4, when a packet is transmitted through a plurality of devices on a network, uncertain delay and jitter occur at each device, and the delay and jitter at the plurality of devices are accumulated, so that the total transmission delay and jitter of the packet will be very large, thereby affecting transmission quality of the packet. At present, a Time-Sensitive Networking (TSN) technology is introduced into the network in order to address the above problem. As shown in FIG. 5, a Cyclic Queuing and Forwarding (CQF) technology is applied in the TSN technology. According to the CQF technology, user packets are received in a time window, and all the received user packets are sent in a next time window. All packets within one time window are received and sent within the same time window, and the packets within the same time window are always maintained within the same time window when being transmitted on any node in the network. The total transmission time of the packet on the network is n*T, in which n is the number of network nodes that the packet passes during the entire transmission process, and T is the size of a time window. The packet may fluctuate within a time window, but does not exceed the time window, and a jitter value brought by the fluctuation of the packet is less than T, in this way, deterministic transmission of the packet on the network is achieved. The CQF technology requires time synchronization between an upstream device and a downstream device, and the upstream device and the downstream device switch between a sending time window and a receiving time window at the same time in the case of time synchronization, therefore, the technology is only suitable for a local area network in which the distance between the upstream device and the downstream device is very short, and the delay of an optical fiber between the devices can be ignored. In metropolitan area networks and wide area networks, the distance between devices is very large, and the transmission delay of a packet on an optical fiber is very long, that is, even though the upstream device and the downstream device switch between the sending time window and the receiving time window at the same time, when a packet sent by a transmitter of the upstream device is transmitted to the receiver of the downstream device through an optical fiber, the time when the packet actually reaches the receiving port of the downstream device has been delayed for a period of time. As shown in FIG. 6, the time difference A in FIG. 6 represents the delay, and the arrival time of the packet does not match with the switching moment of the time window of the receiver of the downstream device. In order to solve the problem caused by the optical fiber delay, an asynchronous CQF solution is proposed. By using the asynchronous CQF solution, time synchronization is not required between the upstream device and the downstream device, the switching moment of the time window of the upstream device may be different from the switching moment of the time window of the downstream device, only clock frequency synchronization and the same switching speed of the time windows is required between the upstream device and the downstream device. When sending a packet, the upstream device carries a sending time window value of the upstream device in the packet, and when receiving the packet, the downstream device may know the time window at which the packet is sent in the upstream device by extracting the time window value carried in the packet. The asynchronous CQF technology does not require time synchronization between the upstream device and the downstream device, and does not require time windows of the upstream device and the downstream device to be switched at the same time, thereby avoiding the influence of the optical fiber transmission time between the upstream device and the downstream device, and addressing the problem that the delay of an optical fiber cannot be ignored in a metropolitan area network and a wide area network. As shown in FIG. 7, after the asynchronous CQF technology is adopted, the downstream device extracts the time window value carried in the user packet, and determines that the carried time window value is the time window position of sending the packet by the transmitter of the upstream device. The same time window values in the packets represent that these packets are sent in the same time window, and different time window values in the packets represent that these packets are not in the same time window. The downstream device needs to forward packets with the same time window value in the same time window. The time window values may have a plurality of values. In FIG. 7, the time window value ranges from 1 to 8. All the packets sent by the transmitter of the upstream device in the time window 1 carry a window value equal to 1; all the packets sent by the transmitter of the upstream device in the time window 2 carry a window value equal to 2; . . . ; all the packets sent by the transmitter of the upstream device in the time window 8 carry a window value equal to 8; all the packets sent by the transmitter of the upstream device in the next time window carry a window value equal to 1, and the time window values appear in succession and cyclically. The fiber delay may be relatively large, and may be greater than the length of one time window, for example, the fiber delay may be equal to 2.7 times the length of a single time window. When the upstream device sends a packet, a sending time window value of the upstream device is carried in the packet, and when receiving the packet, the downstream device can know, by extracting the time window value carried in the packet, the time window within which the packet is sent in the upstream device, in this way, the sending position of the packet at the transmitter of the upstream device can be determined. As shown in FIG. 8, the position of the switching moment of the time window of the upstream device can be determined according to the position of the change of the time window value carried in the packets. The asynchronous CQF technology does not require time synchronization between the upstream device and the downstream device, and time windows of the upstream device and the downstream device do not need to be switched at the same time, thereby avoiding the problem caused by transmission delay in the optical fiber between the upstream device and the downstream device, so that the solution can be applied to an application scenario in which the transmission delay in the optical fiber cannot be ignored in a metropolitan area network and a wide area network.

In the asynchronous CQF technology, the downstream device determines, by extracting a time window value carried in a packet, the time window at which the packet is sent in the upstream device, and determines the switching moment of the time window of the upstream device according to the change of the time window values carried in the packets. Under normal conditions, the switching moment of the time window at the sending port of the upstream device is periodic and regular, and is always stable and unchanged, and the time window value that the downstream device extracts from the packet also varies periodically according to a fixed rule. When an exception occurs on the upstream device, such as reset restart and optical fiber switching, the position of the switching moment of the sending time window of the upstream device and the time window value carried in the packet may suddenly change, the downstream device needs to detect such an abnormal change, then reconfigures a delay parameter of receiving the packet in the downstream device, and updates the position of the sending time window of the corresponding packet in the downstream device. It may be concluded that it is very important that the downstream device detects the switching moment of the sending time window of the upstream device in real time, and detects whether the time window value carried in the packet is abnormal. In a scenario in which a large number of user packets are transmitted, the downstream device continuously receives user packets, so as to extract the time window values in the user packets, and determine the position of the switching moment of the time window of an upstream device according to the time window values in the user packets, thereby conveniently deciding whether the switching moment of the time window of the upstream device is abnormal and whether the time window values carried in the user packets are abnormal.

Figure 9:
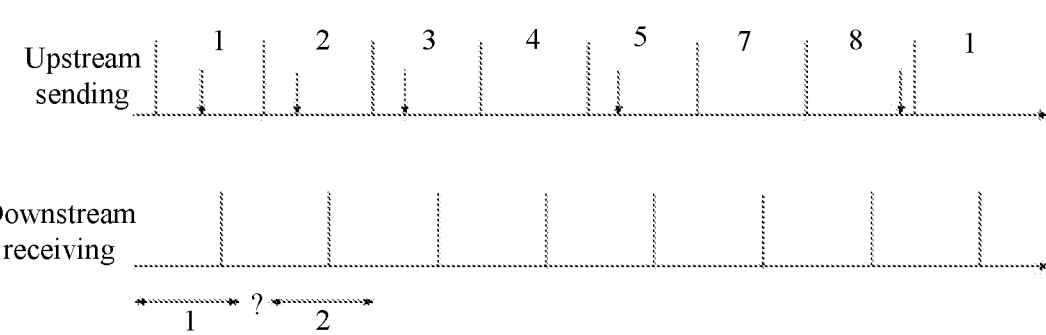
FIG. 9 is a schematic diagram illustrating a problem encountered when implementing the asynchronous CQF technology according to an embodiment of the present disclosure.

When few user packets are transmitted on the network or no user packet is sent within a short period of time, as shown in FIG. 9, the downstream device cannot accurately determine the switching moment of the time window of the upstream device. When a fault exception occurs in the upstream device, there may be a sudden change of the time window in the upstream device, and the downstream device cannot detect the time window exception of the upstream device and still forward the packet according to a previous time window, so that the forwarding operation cannot meet a requirement of the new time window, a forwarding operation error occurs, and a user service is interrupted in a serious case.

Figure 10:
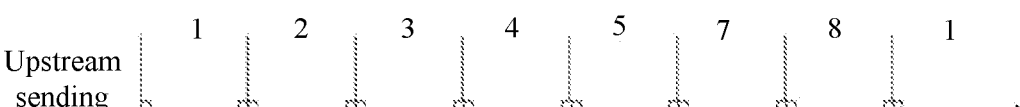
FIG. 10 is a schematic diagram of two time slice positions before and after a switching moment of a time window according to an embodiment of the present disclosure.
Figure 11:
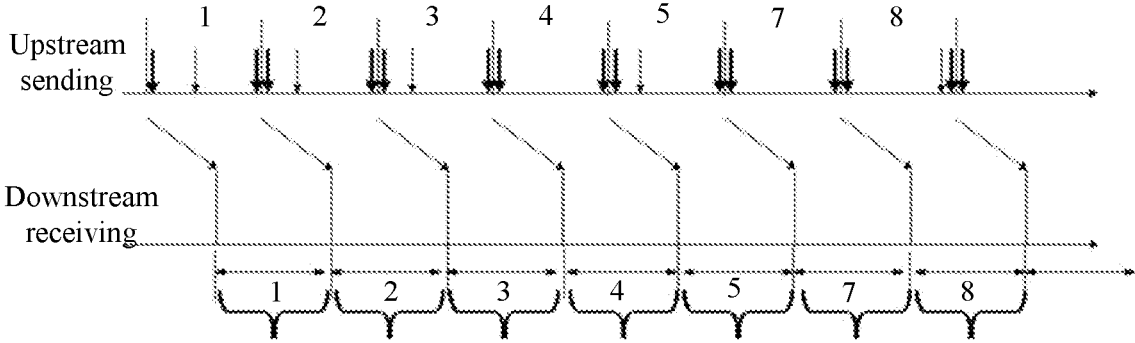
FIG. 11 is a schematic structural diagram of a data transmission method according to an embodiment of the present disclosure.

In order to solve this problem, and facilitate the downstream device to monitor in real time whether the time window sent by the upstream device is abnormal, the embodiments of the present disclosure provide a solution of sending a packet specially defined to remedy the problem caused by the lack of the user packets, so that the downstream device accurately knows the switching position of the time window of the upstream device, thereby quickly and accurately determining whether the switching moment of the time window of the upstream device is abnormal. Once the sudden change of the sending time window of the upstream device is detected, the downstream device quickly forwards the user service according to the new time window after the sudden change, thereby shortening the fault recovery time. The specific implementation is as follows. As shown in FIG. 10, a transmitter of the upstream device determines, in two time slices before and after the switching moment of the sending time window, whether there is a user packet to be sent in the two time slices. If no packet is to be sent in a time slice, a supplementary packet specially defined is sent to the downstream device in the time slice, so as to remedy the problem caused by the lack of the user packet to be sent. As shown in FIG. 11, the packet represented by the bold black arrow in FIG. 11 is the packet specially defined. The packet specially defined is a self-defined packet agreed between the upstream device and the downstream device, and the packet may have a specially defined flag and carry the time window value of the packet. The time slice is not less than the time required for sending the packet specifically defined, so as to ensure that the sending of the packet specifically defined is able to be completed within the time slice. By adopting the manner of sending the supplementary packet specifically defined, the transmitter can ensure that the transmitter has a packet sent to the downstream device before and after the switching moment of the time window, even if there is no user packet to be transmitted on the link. The packets before and after the switching moment of the time window carry different time window values, and the downstream device can accurately determine the position of the switching moment of the time window of the upstream device according to the carried time window values. After detecting the packet specially defined, the receiver of the downstream device directly extracts the window information value carried in the packet to determine the switching moment of the time window of the upstream device, and then the receiver discards the packet specially defined. The packet specially defined is only used for bearing the information of the time window value, and after the information of the time window value has been delivered, the packet specially defined is useless and therefore may be discarded.

The packet specially defined is a self-defined packet agreed between the upstream device and the downstream device and has a specific flag feature, and the downstream device determines that the current packet is a packet specially defined by detecting the specific flag feature of the packet, extracts the time window value carried in the packet, and then discards the packet. The packet specially defined may be an Ethernet packet that carries the specific flag feature, and the packet specially defined may be acquired by adding the specific flag feature and the time window value information in the ordinary Ethernet packet. As shown in FIG. 12, FIG. 12 shows the structure of an ordinary Ethernet packet, and a Type field in the ordinary Ethernet packet may carry the specific flag feature, for example, a characteristic value of the type field being 0xffff is used as the specific flag feature. The specific flag feature may be in various other forms, for example, a packet whose destination address field value is a specific destination address value (for example, 0xff-ff-ff-ff-ff) in an ordinary Ethernet packet may be used as the packet specially defined.

The specifically defined packet may be in a format of an ordinary Ethernet packet, or may be a specific code stream sequence in a form of a code stream sequence at a PCS layer in a physical layer of the ordinary Ethernet packet. For example, when an ordinary Ethernet packet is sent at a physical port, 64/66 encoding is performed first, and then the packet is sent in a 66-bit block flow mode. As shown in FIG. 13, the code block sequence after 64/66 coding of the ordinary Ethernet packet consists of an S block+several D blocks+a T block, wherein the S block is the start block of the packet, the D blocks are the data blocks, and the T block is the end block. In the definition of the Ethernet standard, the S block content is composed of 66 bits, and the structure is as follows: "0b10"+"0x78"+7 "0x55". The "0b10"+ "0x78" field is generally used to identify an S block, and the following 7 "0x55" fields may be appropriately modified in specific application, for example, some of the 7 "0x55" fields may be modified into a specific definition flag, for example, six "0x55"+"0xAA" fields may be used as a packet specially defined carrying a specific definition flag (the window value is carried in a part of the D blocks). In practical applications, the "0x78" field may alternatively be modified to be another field value unused in the Ethernet standards as the specific definition flag. Since the minimum packet length defined in the Ethernet standard is 64 bytes, the number of the D blocks in the code block sequence stream obtained after encoding the ordinary Ethernet packet is not less than 4, a packet block having fewer than four D blocks is an invalid packet block, and the receiver may discard the code block sequence after receiving the invalid packet block, therefore, a code block flow sequence S+n*D (n being any one of 0, 1, 2 and 3)+T may be used as the packet specially defined, for example, an S+T code block flow sequence, an S+D+T code block flow sequence, an S+D+D+T code block flow sequence, or an S+D+D+D+T code block flow sequence may be used as the packet specially defined, and the time window value may be carried on the D block or on the T block. After detecting these types of code block stream sequences, the receiver may identify a packet as a packet specially defined by checking the number of the D blocks, the time window values on the D blocks or the T blocks are extracted, and then the code block sequences are discarded.

In practical application, besides the use of the ordinary Ethernet packet or the specific code block sequence carrying the specially defined symbol as the packet specially defined, a new function may alternatively be extended in the Ethernet protocol packet to carry the time window value. For example, in an Ethernet physical interface, a Pause frame is used to instruct a peer device to suspend the sending of packets, thereby limiting the sending speed of a user service. The receiver starts a flow control operation after receiving the Pause frame, and then discards the Pause frame packet. The format of the Pause frame is as shown in FIG. 14. In the Pause frame, the destination address field is a fixed value (0x01-80-C2-00-00-01), the Type value is 0x8808, and the operation code is 0x0001. The operation parameter is the time length for which the sender of the PAUSE frame requests the peer device to stop sending the data frame, the time unit is the time used for transmitting 512-bit data at the current transmission rate, and the actual pause time of the receiver is the product of the content of the operation parameter field and the time used for transmitting 512-bit data at the current transmission rate. In practical application, the operating parameter is typically 0xFFFF and the pause time is the maximum value. In practical application, the operating parameter being 0x0000 may be taken as a specific definition flag (the Pause frame with the operating parameter being 0x0000 represents no flow control during flow control), and the pause packet with the operating parameter being 0x0000 (which may also be another operating value)

is taken as the packet specially defined. As shown in FIG. 14, the time window value is carried in the reserved field of the pause packet. After receiving a pause packet with the operation code 0x0000, the receiver extracts the time window value in the reserved field.

Figure 15:
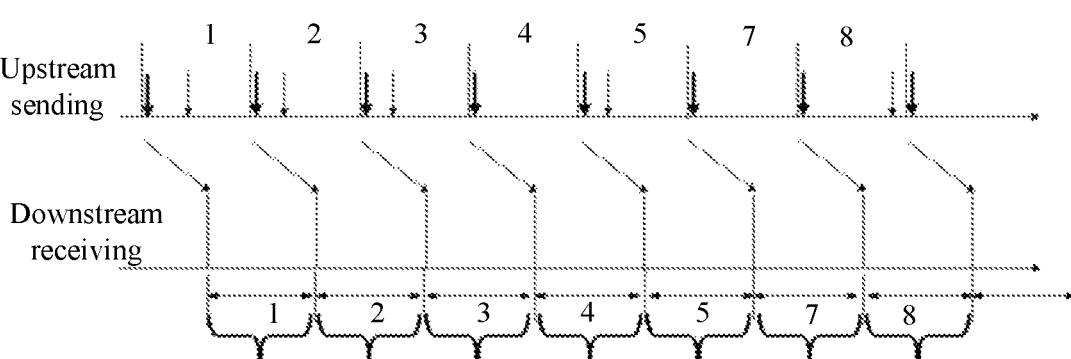
FIG. 15 is another schematic structural diagram of a data transmission method according to an embodiment of the present disclosure.
Figure 16:
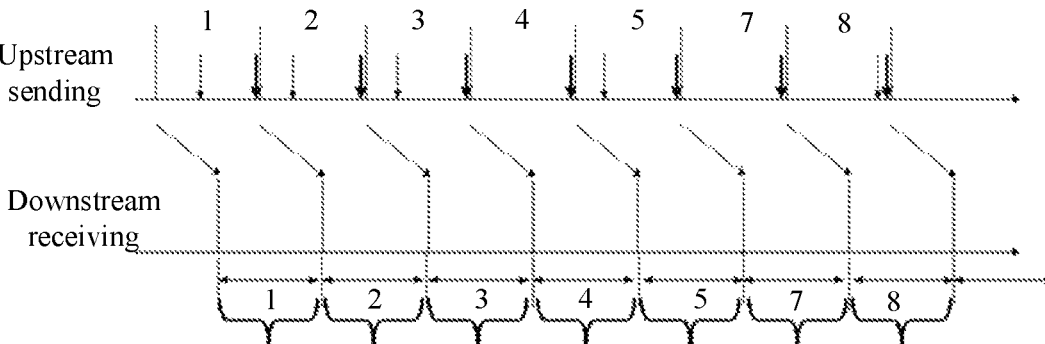
FIG. 16 is yet another schematic structural diagram of a data transmission method according to an embodiment of the present disclosure.

With reference to the embodiment shown in FIG. 11, detection is performed in two time slices before and after the switching moment of the time window of the upstream device. However, in practical applications, detection may be performed in only one of the time slices and a supplementary packet specially defined may be sent in only one of the time slices, as shown in the embodiment shown in FIG. 15. In FIG. 15, detection is performed and the supplementary packet specially defined is sent only in the time slice after the switching moment of the detection time window. When the upstream device and the downstream device negotiate to detect and send a supplementary packet specially defined only in the time slice after the switching moment of the detection time window, the upstream device detects and sends the supplementary packet specially defined only in the time slice after the switching moment of the detection time window. When receiving the packet specially defined, the downstream device determines that the moment of the start position of the packet is the switching position of the time window, and the time window value carried in the packet is the period value after the switching. In practical applications, it is also possible that the detection is performed and the supplementary packet specifically defined is sent only in the time slice before the switching moment of the detection time window. In the embodiment shown in FIG. 16, when the upstream device and the downstream device negotiate to perform detection and send a supplementary packet specially defined only in the time slice before the switching moment of the detection time window, the upstream device performs detection and sends the packet specially defined only in the time slice before the switching moment of the detection time window, when receiving the packet specially defined, the downstream device determines that the end moment of the packet is the switching position of the time window, and the time window value carried in the packet is the time period value before the switching.

Figure 17:
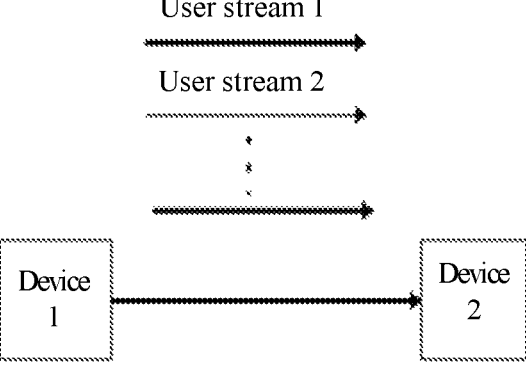
FIG. 17 is a schematic diagram of an application scenario of a data transmission method according to an embodiment of the present disclosure.
Figure 18:
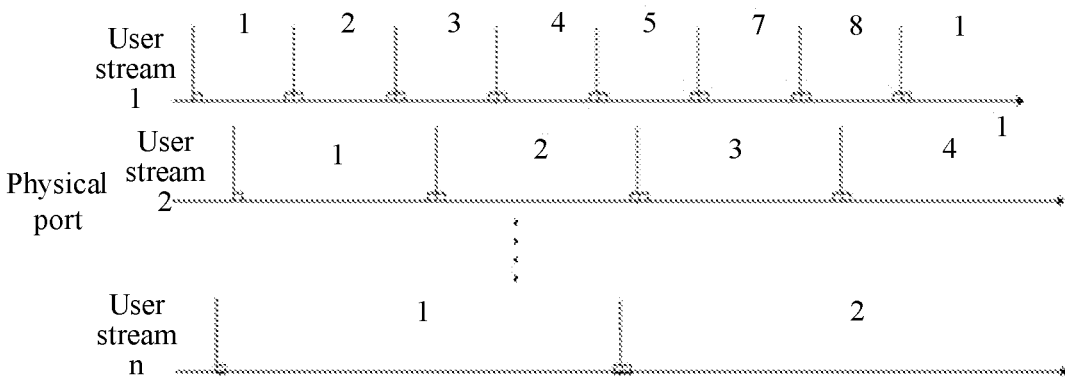
FIG. 18 is a schematic structural diagram of different window values of a data transmission method according to an embodiment of the present disclosure.

In the foregoing embodiment, both the transmitting port and the receiving port work according to physical ports, and one physical port has only one time window value. In practical operation, a physical port may have a plurality of user streams, and each user stream has an independent and different time window value. As shown in FIG. 17, there are a plurality of different user service streams on a same physical link (the same pair of physical transmitting port and physical receiving port), different user service streams have different sending time periods and different switching moments of sending time windows. As shown in FIG. 18, when different user service flows exist in the same physical port, the time windows at the transmitter work periodically according to the time windows of the respective user flows. When there is no user service flow before the switching moment of the time window of an independent user service flow and/or after the switching moment of the time window of the independent user service flow, a supplementary packet specially defined for the user service flow is sent. The packet specially defined has a specific flag corresponding to the user service flow, and the transmitter may identify that the packet specially defined belongs to the user service stream. In practical implementation, there are various different manners. For example, different user streams may be identified by using VLAN labels, and for the same user stream, the user service and the packet specially defined for the user service stream have the same VLAN label value. At the receiving physical port, processing is performed respectively according to different user service streams. For the same user stream, the packet specially defined in the current user service stream is extracted, and a time window value in the packet is acquired, so as to further determine the switching moment of the time window of the upstream port of the user stream.

The application scenario of the present disclosure given in the foregoing embodiments is an asynchronous CQF working scenario, and in a practical application, the embodiments of the present invention may also be applied to an 802.1Qch working scenario in a TSN protocol family, that is, a CQF (synchronous CQF). In 802.1Qch protocol, time synchronization between the upstream device and the downstream device (or network devices) is required, but when the solution in the embodiments of the present disclosure is applied, time synchronization between devices may not be required, and it is only required to carry the sending time window value in the packet, and when there is no a user packet in a time slice before and a time slice after the switching moment of the sending time window, a supplementary packet specially defined carrying the time window value is sent to the downstream device.

In the embodiments provided in the present disclosure, the packet specially defined may also be acquired by extending a new function in an ordinary user packet to carry a specific flag feature and a time window value. The packet specially defined may also be in other forms, and various positions may be used to carry the time window value, which is not limited in the present disclosure.

According to the embodiments of the present disclosure, it is determined whether there is a packet to be sent at a switching moment of a current time window; and the first network device sends a preset identification packet to a second network device in a case where there is no packet to be sent at the switching moment of the current time window, wherein the preset identification packet carries a window value of the current time window, and the window value is used for enabling the second network device to determine switching moments of different time windows of the first network device. By virtue of the solution, the downstream device is able to accurately know the switching position of the time window of the upstream device based on the sent supplementary packets specifically defined, so that the downstream device can quickly forward the user service according to the new time window after the sudden change, thereby shortening the fault recovery time, and improving the communication efficiency.

Through the description of the foregoing embodiments, a person having ordinary skill in the art may clearly understand that the method according to the foregoing embodiments may be implemented by software in addition to a necessary universal hardware platform, and definitely may also be implemented by hardware. However, in many cases, the former is a preferred implementation. Based on such understanding, the technical solutions of the present disclosure essentially or the part contributing to the related art may be embodied in the form of a software product, the computer software product is stored in a storage medium (such as a ROM/RAM, a magnetic disk, and an optical disk), and includes several instructions for instructing a terminal device (which may be a mobile phone), a computer, a server, a network device, or the like.

The present embodiment further provides a data transmission apparatus, which is configured to implement the described embodiments and exemplary implementations, and what has been described will not be elaborated. The term "module", as used hereinafter, is a combination of software and/or hardware capable of realizing a predetermined function. Although the apparatus described in the following embodiment is preferably implemented by software, implementation of hardware or a combination of software and hardware is also possible and conceived.

Figure 19:
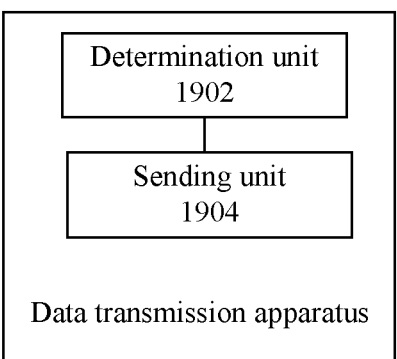
FIG. 19 is a schematic structural diagram of a data transmission apparatus according to an embodiment of the present disclosure.

FIG. 19 is a schematic structural diagram of a data transmission apparatus according to an embodiment of the present disclosure. As shown in FIG. 19, the apparatus includes:

a determination unit 1902, configured to determine whether there is a packet to be sent at a switching moment of a current time window; and a sending unit 1904, configured to enable the first network device to send a preset identification packet to a second network device in a case where there is no packet to be sent at the switching moment of the current time window, wherein the preset identification packet carries a window value of the current time window, and the window value is used for enabling the second network device to determine switching moments of different time windows of the first network device.

In the embodiments of the present disclosure, the first network device may include, but is not limited to, an upstream device in a transmission process of a packet in the network, and the second network device may include, but is not limited to, a downstream device in a transmission process of the packet in the network. The first network device may send a data packet to the second network device.

In the embodiments of the present disclosure, time synchronization is not required between the upstream device and the downstream device, the switching moment of the time window of the upstream device may be different from the switching moment of the time window of the downstream device, only clock frequency synchronization between the upstream device and the downstream device is required, and time window switching speeds between the upstream device and the downstream device are the same. When sending a packet, the upstream device adds a sending time window value of the upstream device in the packet, and when receiving the packet, the downstream device may know in which time window the packet is sent in the upstream device by extracting the time window value carried in the packet. In a data packet transmission process, user packets are received in one time window, and then all the received user packets are sent out in the next time window. All the packets in one time window are received and sent in the same time window; and the packets in the same time window are always kept in the same time window when being transmitted on any node in a network.

By means of the embodiments of the present disclosure, it is determined whether there is a packet to be sent at a switching moment of a current time window; and the first network device sends a preset identification packet to a second network device in a case where there is no packet to be sent at the switching moment of the current time window, wherein the preset identification packet carries a window value of the current time window, and the window value is used for enabling the second network device to determine switching moments of different time windows of the first network device. By virtue of the solution, the downstream device is able to accurately know the switching position of the time window of the upstream device based on the additionally sent preset packets, so that the downstream device can quickly forward the user service according to the new time window after the sudden change, thereby shortening the fault recovery time, and improving the communication efficiency.

Figure 20:
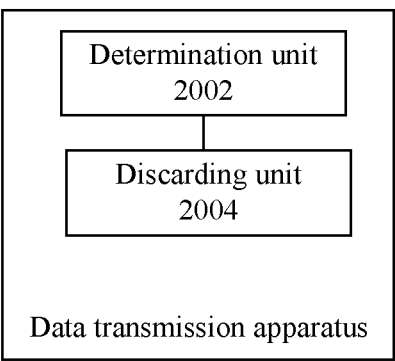
FIG. 20 is a schematic structural diagram of another data transmission apparatus according to an embodiment of the present disclosure.

FIG. 20 is a schematic structural diagram of another data transmission apparatus according to an embodiment of the present disclosure. As shown in FIG. 20, the apparatus includes:

a determination unit 2002, configured to enable, in a case where there is no packet to be sent at a switching moment of a current time window, a second network device to receive a preset identification packet sent by a first network device, and determine the switching moment of the current time window of the first network device, wherein the preset identification packet includes a window value of the current time window; and a discarding unit 2004, configured to discard the preset identification packet after the second network device acquires the window value of the current time window.

It should be noted that each module may be implemented by software or hardware. The latter may be implemented in the following manner, but is not limited thereto. All the modules are located in a same processor; alternatively, the modules are located in different processors in an arbitrary combination.

The embodiments of the present disclosure also provide a computer-readable storage medium. The computer-readable storage medium stores a computer program, wherein the computer program, when running on a processor, causes the processor to execute the operations in any one of the described method embodiments.

In an exemplary embodiment, the computer-readable storage medium may include, but is not limited to, any medium that can store a computer program, such as a USB flash drive, a Read-Only Memory (ROM), a Random Access Memory (RAM), a removable hard disk, a magnetic disk, or an optical disc.

The embodiments of the present disclosure further provide an electronic apparatus, including a memory and a processor. The memory stores a computer program. The processor is configured to run the computer program to execute operations in any one of the method embodiments.

In an exemplary embodiment, the electronic apparatus may further include a transmission device and an input/output device, wherein the transmission device is connected to the processor, and the input/output device is connected to the processor.

For specific examples in this embodiment, reference may be made to the examples described in the foregoing embodiments and exemplary embodiments, and details are not repeatedly described in this embodiment.

Obviously, those having ordinary skill in the art should understand that each module or each operation of the present disclosure can be implemented by a universal computing device, they may be centralized on a single computing device or distributed on a network composed of a plurality of computing devices, they can be implemented by program codes executable by a computing apparatus, and thus can be stored in a storage apparatus and executed by the computing apparatus, furthermore, in some cases, the shown or described operations may be executed in an order different from that described here, or they are made into integrated circuit modules respectively, or a plurality of modules or operations therein are made into a single integrated circuit module for implementation. As such, the present disclosure is not limited to any particular hardware and software combination.

The foregoing descriptions are merely exemplary embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection of the present disclosure.

What is claimed is:

1. A data transmission method, comprising:
determining, by a first network device, whether there is a packet to be sent at a switching moment of a current time window; and
sending, by the first network device, a preset identification packet to a second network device in a case where there is no packet to be sent at the switching moment of the current time window, wherein the preset identification packet carries a window value of the current time window, and the window value is used for enabling the second network device to determine switching moments of different time windows of the first network device.

2. The method according to claim 1, wherein determining, by the first network device, whether there is a packet to be sent at the switching moment of the current time window comprises:
determining, by the first network device, whether there is a packet to be sent in a time slice before the switching moment of the current time window; or
determining, by the first network device, whether there is a packet to be sent in a time slice after the switching moment of the current time window, wherein the time slice is used for indicating time required for sending an Ethernet packet.

3. The method according to claim 2, wherein sending, by the first network device, the preset identification packet to the second network device in the case where there is no packet to be sent at the switching moment of the current time window comprises:
in a case where there is no packet to be sent in the time slice before the switching moment of the current time window, sending, by the first network device, the preset identification packet to the second network device; or
in a case where there is no packet to be sent in the time slice after the switching moment of the current time window, sending, by the first network device, the preset identification packet to the second network device.

4. The method according to claim 1, wherein the preset identification packet comprises a type label field, and sending, by the first network device, the preset identification packet to the second network device in the case where there is no packet to be sent at the switching moment of the current time window comprises:
sending, by the first network device, the preset identification packet to the second network device in the case where there is no packet to be sent at the switching moment of the current time window, so that the second network device determines a type of the preset identification packet according to the type label field, extracts the window value of the current time window, and discards the preset identification packet.

5. The method according to claim 1, further comprising:
in a case where there are multiple types of time windows at a transmitting port of the packet to be sent, and there is no packet to be sent at the switching moment of each type of time window, sending, by the first network device, the preset identification packet comprising a type label to the second network device, so that the second network device determines switching moments of the multiple types of time windows according to the type label, wherein the type label is used for indicating different window types.

6. The method according to claim 1, wherein the preset identification packet comprises at least one of:

a pause packet for controlling data traffic, a Virtual Local Area Network (VLAN) label packet, a packet comprising a destination address and a source address of the packet, and a code block flow sequence.

7. A network device, comprising a memory storing instructions and a processor in communication with the memory, wherein the processor is configured to execute the instructions to:

execute the method according to claim 1.

8. A non-transitory computer-readable storage medium, wherein the computer-readable storage medium stores a computer program, wherein the computer program, when running on a processor, causes the processor to execute the method according to claim 1.

9. A data transmission method, comprising:

in a case where there is no packet to be sent at a switching moment of a current time window, receiving, by a second network device, a preset identification packet sent by a first network device, and determining, by the second network device, the switching moment of the current time window of the first network device, wherein the preset identification packet comprises a window value of the current time window; and discarding the preset identification packet after the second network device acquires the window value of the current time window.

10. The method according to claim 9, wherein in the case where there is no packet to be sent at the switching moment of the current time window, receiving, by the second network device, the preset identification packet sent by the first network device comprises:

in a case where there is no packet to be sent in a time slice before the switching moment of the current time window, receiving, by the second network device, the preset identification packet sent by the first network device; or in a case where there is no packet to be sent in a time slice after the switching moment of the current time window, receiving, by the second network device, the preset identification packet sent by the first network device.

11. The method according to claim 10, wherein determining, by the second network device, the switching moment of the current time window of the first network device comprises:

when receiving, by the second network device, the preset identification packet sent by the first network device in the case where there is no packet to be sent in the time slice before the switching moment of the current time window, determining, by the second network device, that an end time of the preset identification packet is the switching moment of the current time window of the first network device.

12. The method according to claim 10, wherein determining, by the second network device, the switching moment of the current time window of the first network device comprises:

when receiving, by the second network device, the preset identification packet sent by the first network device in the case where there is no packet to be sent in a time slice after the switching moment of the current time window, determining, by the second network device, that a start time of the preset identification packet is the switching moment of the current time window of the first network device.

13. The method according to claim 10, wherein determining, by the second network device, the switching moment of the current time window of the first network device comprises:

when receiving, by the second network device, the preset identification packet sent by the first network device in the case where there is no packet to be sent in the time slice before the switching moment of the current time window, and receiving, by the second network device, the preset identification packet sent by the first network device in the case where there is no packet to be sent in a time slice after the switching moment of the current time window, determining, by the second network device, that a boundary position of two adjacent packets is the switching moment of the current time window of the first network device.

14. The method according to claim 9, wherein the preset identification packet comprises a type label field, and in the case where there is no packet to be sent at the switching moment of the current time window, receiving, by the second network device, the preset identification packet sent by the first network device comprises:

in the case where there is no packet to be sent at the switching moment of the current time window, determining, by the second network device, a type of the preset identification packet according to the type label field; and extracting the window value of the current time window and discarding the preset identification packet.

15. The method according to claim 9, comprising:

in a case where there are multiple types of time windows at a transmitting port of the packet to be sent, and there is no packet to be sent at the switching moment of each type of time window, receiving, by the second network device, packets corresponding to the multiple types of time windows, wherein the packets corresponding to the multiple types of time windows comprise different type labels; and determining, by the second network device, switching moments of the multiple types of time windows according to the type labels.

16. A network device, comprising a memory storing instructions and a processor in communication with the memory, wherein the processor is configured to execute the instructions to execute the method according to claim 9.

17. The method according to claim 9, wherein the preset identification packet comprises at least one of:

a pause packet for controlling data traffic, a Virtual Local Area Network (VLAN) label packet, a packet comprising a destination address and a source address of the packet, and a code block flow sequence.

18. A non-transitory computer-readable storage medium, wherein the computer-readable storage medium stores a computer program, wherein the computer program, when running on a processor, causes the processor to execute the method according to claim 9.

19. A data transmission apparatus, comprising a memory storing instructions and a processor in communication with the memory, wherein the processor is configured to execute the instructions to:

determine whether there is a packet to be sent at a switching moment of a current time window; and

enable the first network device to send a preset identification packet to a second network device in a case where there is no packet to be sent at the switching moment of the current time window, wherein the preset identification packet carries a window value of the current time window, and the window value is used for enabling the second network device to determine switching moments of different time windows of the first network device.

20. A data transmission apparatus, comprising a memory storing instructions and a processor in communication with the memory, wherein the processor is configured to execute the instructions to:

enable, in a case where there is no packet to be sent at a switching moment of a current time window, a second network device to receive a preset identification packet sent by a first network device, and determine the switching moment of the current time window of the first network device, wherein the preset identification packet comprises a window value of the current time window; and discard the preset identification packet after the second network device acquires the window value of the current time window.

* * * * *

24